F. BRAMER & O. W. BADGER.
O. W. BADGER assignor to said BRAMER.
Wheel-Harrow.
No. 8,080. Reissued Feb. 12, 1878.
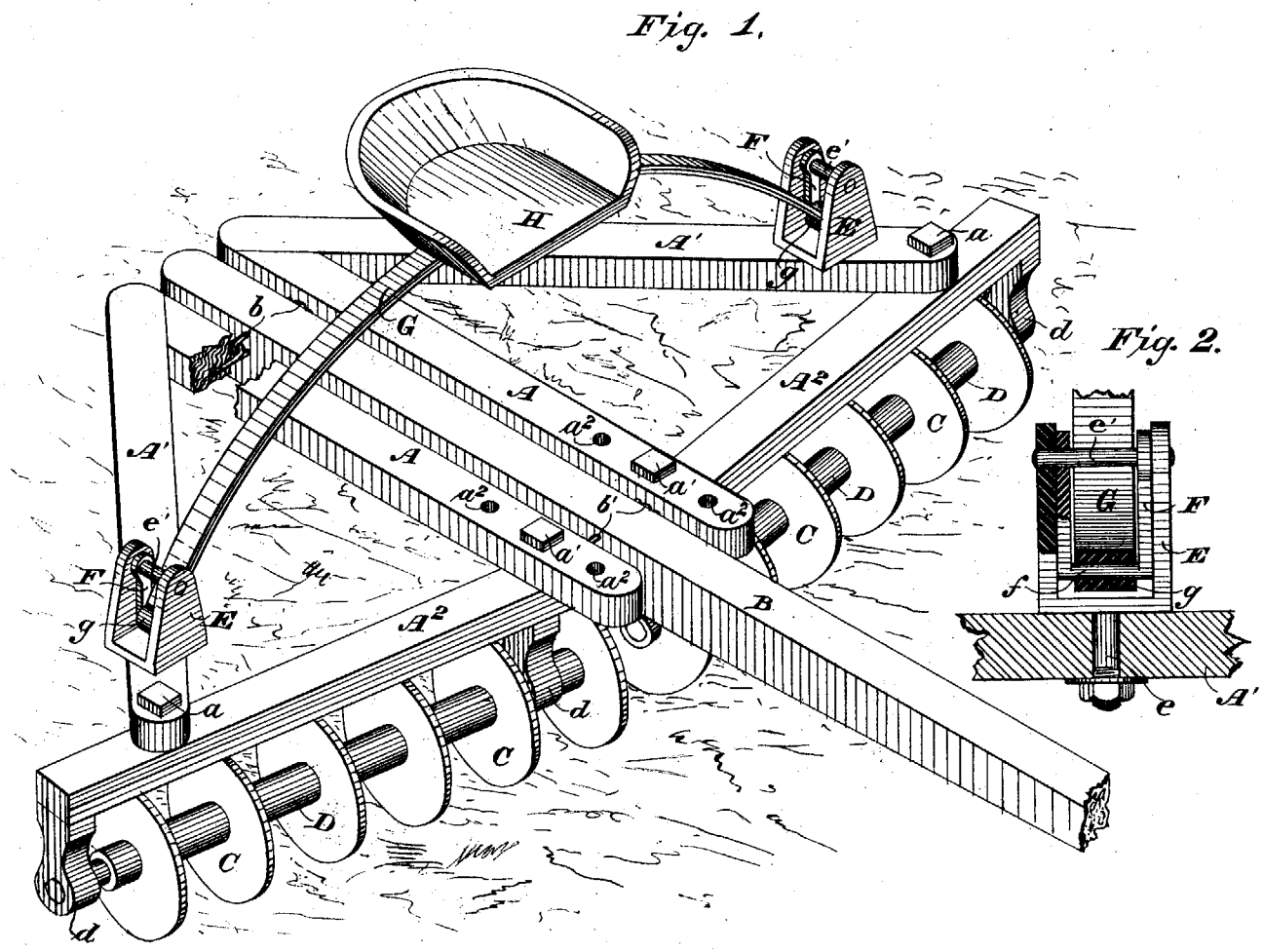
WITNESSES
Wm. A. Skinkle
Geo. W. Breck.
INVENTORS.
Frank Bramer
Orrin W. Badger.
By their Attorneys,
Baldwin, Hopkins & Peyton
THE NORRIS PETERS CO., PHOTO-LITHO., WASHINGTON, D. C.

UNITED STATES PATENT OFFICE.

FRANK BRAMER, OF LITTLE FALLS, AND ORRIN W. BADGER, OF WHITNEY'S POINT, NEW YORK; SAID BADGER ASSIGNOR TO SAID BRAMER.

IMPROVEMENT IN WHEEL-HARROWS.

Specification forming part of Letters Patent No. 174,767, dated March 14, 1876; Reissue No. 8,080, dated February 12, 1878; application filed January 25, 1878.

*To all whom it may concern:*

Be it known that we, FRANK BRAMER, of Little Falls, in the county of Herkimer and State of New York, and ORRIN W. BADGER, of Whitney's Point, in the county of Broome and State aforesaid, have jointly invented certain new and useful Improvements in Wheel-Harrows, of which the following is a specification:

Our invention relates to that class of wheel-harrows having separate gangs of disks adjustably connected to the tongue or draft-frame.

The object of the first part of our invention is so to connect wheel-gangs with their draft-connections as to permit of their freely conforming to the undulations of the surface over which they travel.

To this end our invention consists in a novel method of hinging wheel-gangs to an interposed pole or pole-frame, whereby said gangs are adapted to follow the uneven surface of the ground, as hereinafter explained.

The next part of our invention relates to the driver's seat. The object is to utilize the weight of the driver for holding the harrows closely down to their work without interfering with their freedom of movement in following the uneven surface of the ground over which they are drawn; to which end this part of our invention consists in the combination of wheel-gangs hinged together at their inner ends, with a driver's seat mounted upon a transverse support or bar pivoted upon the gang pieces, planks, or frames, near their outer ends, whereby we are enabled to apply the weight of the driver to hold the gangs down to their work without interfering with their freedom of movement in following irregularities in the surface of the ground.

Our invention further consists in a novel method of mounting the driver's seat on swiveling supports, to compensate adjustment or play of the gang-frames.

Our improvements further relate to certain novel details of the method of swiveling the seat-support on the gang-frames.

The subject-matter claimed will be hereinafter specifically designated.

In the accompanying drawings, which show all our improvements embodied in one machine, Figure 1 represents a view, in perspective, of so much of a wheel-harrow as is necessary to illustrate the subject-matter herein claimed; and Fig. 2, a vertical section through one of the swiveling supports of the driver's seat.

The gang pieces, planks, or frames may be of any usual construction, but, by preference, are made, as shown in the drawings, of a triangular form, with the two side bars A $A^1$, rigidly united to the apex of the triangle in the rear, and with a gang-bar, $A^2$, forming the base and front of the triangle, pivoted near its outer end, by means of a bolt, *a*, to the outer frame piece or bar $A^1$, and near the inner end, by a similar bolt, $a^1$, to the inner bar A. The inner end of gang-bar $A^2$ is adjustably connected with the inner bar A, to permit of the adjustment of the angle of the harrow wheels or disks relatively to the line of draft. This adjustment is shown in the drawings as effected by means of a series of holes, $a^2$, in the inner bar A, in any one of which the bolt $a^1$ may be inserted.

The construction above described gives a strong bracing-frame at a small cost, and requires but a small amount of material.

Both gang pieces, planks, or frames are of a symmetrical shape, and are shown as connected with an intermediate tongue or pole, B, or extension thereof, by hinges *b b'*, of any suitable form to adapt them to vibrate freely in conforming to the undulations of the surface of the ground over which they are drawn, each irrespective of the other. By hinging the gang pieces, planks, or frames to the tongue at two points we are enabled to brace the gangs strongly against transverse strains without interfering with their freedom of movement.

Harrow-wheels C, of the usual or of any preferred construction, are mounted in gangs upon their respective axles D, which have their bearings in down-hangers or pendent supports *d*, attached to the gang-bars $A^2$.

Open-ended troughs, standards, or socket-pieces E are connected with their respective gang-bars by a vertical pivot, *e*, which construction admits of their having a swiveling movement upon said pivot, to compensate for variations in the angle of the gang pieces or bars.

A driver's seat, H, is mounted centrally on a support, G, by preference made in an arch form, and consisting of a stiff spring extending transversely from side to side of the machine. The outer ends of the seat-support are provided with eyes *g*, pivoted upon cross-bars *f* on the lower end of an angular or U-shaped stirrup, F, which swings in the socket-piece E upon a horizontal pin, *e'*. By this means the seat is elevated to a sufficient height above the tongue and gang frames to enable either or both of them to form a convenient foot-rest for the driver, whose weight is thrown upon the gang pieces, planks, or frames at points outside of their centers to hold the gangs properly down to their work, while the swiveling supports of the seat adapt the frames to vibrate freely on their hinge-connections with the tongue without interference from or cramping of the seat-support, and without materially disturbing the position of the driver.

Having now described our invention, what we claim as new, and desire to secure by Letters Patent, is—

1. Wheel-gangs hinged by their inner ends to an intermediate pole or tongue, or to an extension thereof, substantially as hereinbefore set forth, whereby they are enabled freely to conform to the surface over which they travel.

2. The combination, substantially as hereinbefore set forth, of independent wheel-gangs with an intermediate pole or pole-frame, to which they are hinged at two points, whereby they are braced against transverse strains, as well as allowed freely to conform to undulations of the surface over which they travel.

3. The combination, substantially as hereinbefore set forth, of wheel-gangs, an intermediate pole or pole-frame, to which their inner ends are directly hinged, and a transverse seat-support connected with the outer ends of the gang-frames, whereby the weight of the driver keeps the gangs down to their work without interfering with their vibrations on their hinges.

4. A transverse seat-support connected with independently-hinged wheel-gangs by means of swinging compensating links or stirrups, substantially as hereinbefore set forth, whereby the vertical movements of the gangs are limited.

5. The combination, substantially as hereinbefore set forth, of hinged wheel-gangs, swiveling socket-pieces mounted on the gang-frames, and a transverse seat-support pivoted to stirrups in the socket-pieces, whereby both the vertical movements and angular adjustments of the wheel-gangs are compensated.

6. The wheel-harrow hereinbefore described, consisting of the combination of wheel-gangs hinged to an intermediate pole or pole-frame, swiveling socket-pieces mounted on the gang pieces, planks, or frames, swinging stirrups pivoted in said socket-pieces, and a transverse seat-support pivoted to the stirrups, substantially as hereinbefore set forth.

FRANK BRAMER.
ORRIN W. BADGER.

Witnesses to signature of Bramer:
GERRET DRAKE,
ALVARADO L. BURT,

Witnesses to signature of Badger:
L. G. OLMSTEAD,
J. B. SEYMOUR.